United States Patent [19]

Pearce, Jr.

[11] 3,866,460

[45] Feb. 18, 1975

[54] GAS DETECTOR FOR FLUID-FILLED ELECTRICAL APPARATUS

[75] Inventor: Henry A. Pearce, Jr., Stoneboro, Pa.

[73] Assignee: Westinghouse Electric Corporation, Pittsburgh, Pa.

[22] Filed: May 30, 1973

[21] Appl. No.: 365,339

[52] U.S. Cl................ 73/19, 23/253 R, 23/253 PC, 23/254 E, 55/158, 55/270, 73/27 R, 317/14 F
[51] Int. Cl............................................. G01n 7/10
[58] Field of Search........... 23/254 E, 254 R, 232 E, 23/232 R, 255 E, 253 R, 253 PC, 230 R, 230US; 73/19, 26, 27 R; 317/15, 14 F, 14 H; 55/270, 158

[56] References Cited
UNITED STATES PATENTS

| | | | |
|---|---|---|---|
| 3,060,726 | 10/1962 | Weber | 73/19 |
| 3,111,388 | 11/1963 | Horelick et al. | 23/232 E |
| 3,186,917 | 6/1965 | Gerhardt et al. | 23/232 R X |
| 3,680,359 | 8/1972 | Lynch | 73/27 R |
| 3,681,026 | 8/1972 | Holden | 23/253 R X |
| 3,701,632 | 10/1972 | Lovelock | 23/254 E X |
| 3,738,813 | 6/1973 | Esmond | 55/158 X |

Primary Examiner—Joseph Scovronek
Attorney, Agent, or Firm—J. R. Hanway

[57] ABSTRACT

Apparatus and arrangements thereof for detecting the presence of one or more specific gases in the fluid coolant of electrical apparatus. In one embodiment, a diffusion membrane separates the gases from the liquid coolant to provide a gas mixture. Another diffusion membrane separates any hydrogen from the gas mixture. The hydrogen which diffuses through the latter membrane is confined within a closed chamber. Thermal conductivity apparatus measures the pressure of the hydrogen in the chamber, thereby providing an indication of the amount of hydrogen in the chamber and in the liquid coolant. The amount of hydrogen in the liquid coolant is related to the fault history of the electrical apparatus. In other embodiments, the hydrogen contained in a gas coolant is diffused through a single membrane, and the presence of certain gases is indicated by combustibility measuring apparatus.

8 Claims, 9 Drawing Figures

PATENTED FEB 18 1975 3,866,460

GAS DETECTOR FOR FLUID-FILLED ELECTRICAL APPARATUS

BACKGROUND OF THE INVENTION

1. Field of the Invention

This invention relates, in general, to electrical apparatus and, more specifically, to apparatus for detecting gas contained in the coolant of fluid-filled electrical apparatus.

2. Description of the Prior Art

Knowledge about previous arcing, overheating, and partial discharges, or corona, in electrical apparatus is useful in determining if and when a major fault may occur in the apparatus. One very useful method for obtaining the fault history of the electrical apparatus utilizes a gas detector which analyzes characteristics of gases contained within the apparatus enclosure. This provides some knowledge of the fault history since nearly all faults generate gases in the fluid dielectric and coolant of the apparatus.

In some electrical apparatus which contains a liquid coolant, such as oil, a gas space exists above the coolant level. Conventional procedures for analyzing the gases in such apparatus sample the gases in the space above the coolant level. An arrangement which measures a condition of the gas in oil-filled transformers having a gas space is disclosed in U.S. Pat. No. 3,111,388. The apparatus disclosed therein measures the combustible limit of the gases in the gas space by drawing a sample of the gases, isolating the sample from the gas space, and burning the sample in a combustion chamber. The operating principle thereof relies on the fact that most of the gases produced during any of the fault conditions are combustible.

Some electrical apparatus and transformers do not contain any suitable separation between the fluid coolant and the gases produced by fault conditions. Such is the case when a liquid coolant completely fills the enclosure of the apparatus. Therefore, devices which draw a gas sample from the gas space in the apparatus are not usable with such apparatus. Therefore, it is desirable, and it is an object of this invention, to provide a gas detector which may be used with electrical apparatus which does not contain the combination of a fluid coolant and a gas space thereabove.

Since many of the conventional gas detectors burn or oxidize the sampled gas, the sample of gas must not be returned to the electrical apparatus. In such "open" systems, a gas cylinder is usually used to replenish the gas which is taken from the apparatus and never returned. It is also desirable, and it is another object of this invention, to determine the fault history of the electrical apparatus with a "closed" gas detecting system, thereby eliminating the need for any permanent removal of a substantial gas sample from the apparatus.

SUMMARY OF THE INVENTION

There is disclosed herein new and useful apparatus and arrangements for detecting gas in fluid-filled electrical apparatus including those which do not have a separate gas space above a liquid coolant. This provides an indication of the fault history of the electrical apparatus. A diffusion membrane is placed in the fluid coolant of the apparatus. Gases in the fluid coolant diffuse through the membrane and into a chamber. The gases in the chamber may be tested for combustibility to determine the presence of fault generated gases.

In one specific embodiment of the invention, any hydrogen in the gases contained in the chamber is permitted to diffuse through another membrane and into another chamber. This chamber contains a pressure detecting sensor arrangement which provides an indication of the pressure in the chamber, and thus an indication of the hydrogen in the chamber. Since nearly all fault conditions generate some hydrogen, the pressure in the hydrogen chamber is higher when more faults have occurred. The chambers containing the gases are sealed, thus no appreciable amount of gas is removed from the apparatus. In another specific embodiment of this invention, the hydrogen diffusion membrane is placed directly into the fluid coolant. Any hydrogen in the fluid coolant diffuses through the membrane, thereby separating the hydrogen from the fluid coolant and any other gases in the fluid coolant.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
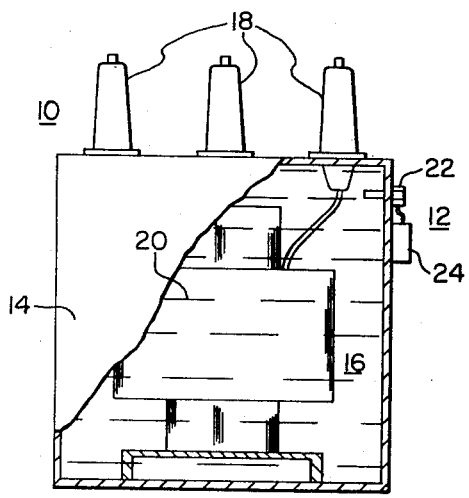
FIG. 1 is a cut-away view of a transformer having a gas detector constructed according to this invention attached thereto.

Throughout the following description, similar reference characters refer to similar elements or members in all the figures of the drawing.

Referring now to the drawing, and to FIG. 1 in particular, there is shown a power transformer 10 with a gas detector 12 constructed according to this invention attached thereto. The transformer 10 includes the tank 14, the core and coil assembly 16, and the electrical bushings 18. The oil 20 completely fills the tank 14, thereby eliminating any significant gas space above the oil level. The gas detector 12 includes the gas separator 22 and the indicating apparatus 24. The gas separator 22 extends through the tank 14 and directly into contact with the oil 20. It is within the contemplation of this invention that the gas detector may be associated with transformers having gas space above the oil by locating the gas separator 22 either above or below the oil level. It is also comtemplated that the invention may be used with gas-filled transformers or other electrical apparatus.

Figure 2:
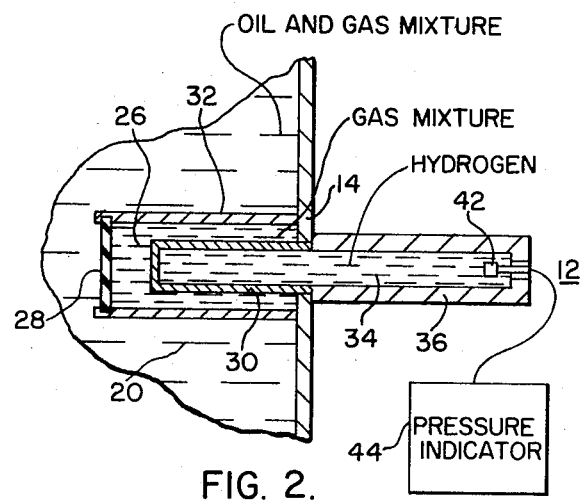
FIG. 2 is a schematic representation of an embodiment of the gas detector of this invention.

FIG. 2 illustrates the operation of the gas detector 12 constructed according to an embodiment of this invention. The detector 12 includes a chamber 26 which is defined by the diffusion membrane 28, the diffusion membrane 30, the structural member 32, and the tank 14. The chamber 34 is defined by the diffusion membrane 30 and the vessel 36. The member 32, the tank 14, and the vessel 36 are each constructed of a suitable material such as steel or copper, and of such thickness that gas will not penetrate therethrough.

The membrane 28 is constructed of a suitable material and of a sufficient thickness to prevent the penetration therethrough of the oil 20 and to permit the penetration therethrough of gases contained in the oil 20. Suitable materials include silicone rubber and fluorosilicone rubber. Other materials which may be useful are ceramic, and polycarbonate and polyester films. A thickness of 18 mils for the silicone rubber materials has been found satisfactory.

The membrane 30 is constructed from a suitable material and of a sufficient thickness to prevent the penetration of any gas into the chamber 26 except hydrogen. A suitable material is a metallic composition of 75 percent by weight of palladium and 25 percent by weight of silver. A thickness for a palladium-silver membrane of approximately 3 mils has been found to be satisfactory.

Figure 3:
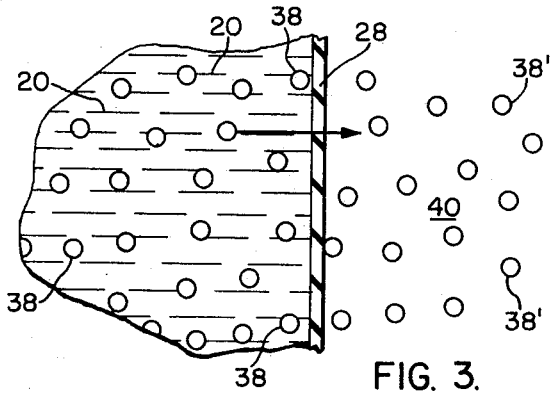
FIG. 3 is a diagram illustrating the diffusion process which occurs in the apparatus of this invention.

FIG. 3 illustrates the diffusion process which occurs through the diffusion membrane 28. Gas molecules 38 contained in the oil 20 exhibit a definite partial pressure based upon the amount of the gas in the oil. Due to the smaller size of the gas molecules 38 as compared to the size of the molecules forming the oil 20, some of the gas molecules 38 will diffuse through the "pores" of the membrane 28 and will be located on the right-hand side of the membrane 28 as represented by the gas molecules 38'. The membrane material determines which gases will diffuse therethrough. With the materials disclosed herein for the membrane 28, a portion of each gas in the oil 20 can diffuse through the membrane 28. Particular membrane materials may permit the diffusion of only certain gases. Only hydrogen will diffuse through a palladium-silver membrane.

The gas molecules 38 will diffuse through the membrane 28 until the partial pressure of the gas molecules 38 in the oil equals the partial pressure of the gas molecules 38' in the gaseous atmosphere 40. Therefore, the number of gas molecules 38 in the oil 20 corresponds to the number of gas molecules 38' in the gaseous atmosphere 40. Since the partial pressures of different gases which are mixed together are distinct, the proportional relationship between the gas molecules on both sides of the membrane 28 is valid for each individual gas.

Referring again to FIG. 2, it can be seen that the gases in the oil 20 diffuse through the membrane 28 and into the chamber 26. Thus, after a sufficient length of time for the diffusion process to arrive at equilibrium, the gas mixture in the chamber 26 contains a ratio of gases which is identical to the ratio of the gases contained in the oil 20. In addition, the partial pressure produced by each gas of the gas mixture in the chamber 26 is proportional to the amount of the same gas in the oil.

There are several gases which may be found in the oil of oil-filled electrical apparatus. Hydrogen, compounds of carbon and hydrogen, carbon monoxide, carbon dioxide, nitrogen, oxygen and argon have all been detected in oil samples from electrical power transformers. The presence of a particular gas depends upon several factors, including the type of fault which produced the gas. It has been found that the three most common transformer faults which produce gases in the oil are arcing, corona or partial discharges, and "hot spots" or overheating. It has also been found that, although each of these faults produce several different gases, each fault produces a significant amount of free hydrogen. Therefore, a measurement of the hydrogen content in the transformer oil will provide a valid indication of the general fault history of the power transformer.

As shown in FIG. 2, the same mixture of gases in the oil 20 exists without any oil in the chamber 26. This mixture will contain free hydrogen when a fault has occured. Thus, the hydrogen diffuses through the membrane 30 and into the chamber 34. Since chamber 34 originally was evacuated, hydrogen comprises the only substantial amount of gas in the chamber 34. The pressure detector 42 is sealed within the chamber 34 and is connected to a pressure indicator 44, both of which having preferred embodiments thereof described hereinafter. Thus, the higher the pressure reading, the greater the amount of free hydrogen contained in the oil 20, and the more active the fault history of the transformer components. By correlating the pressure reading with the proper theoretical and empirical data, a determination of when a major fault is likely to occur in the transformer may be made and the necessary precautions taken. Such a pressure indication may also serve to alert personnel to take a sample of oil and analyze the sample in the laboratory with equipment capable of determining the amount of each gas in the oil, thereby furnishing information about the particular type of fault or faults which have occurred.

The thickness of membranes 28 and 30 generally determine the time constant of the diffusion process or the time required to obtain a certain degree of equilibrium between the gases on both sides of the membrane. The time constant may be shortened by reducing the thickness of the membrane. Another arrangement to shorten the time constant is to heat the gas which is diffused through the membrane. Therefore, a heating element placed in the chamber 26 would shorten the time constant of the membrane 30.

Figure 4:
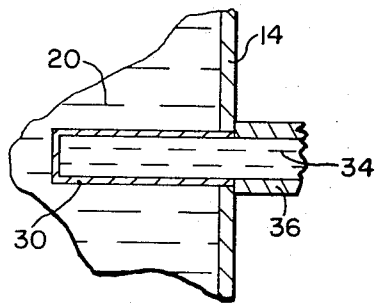
FIG. 4 is a schematic representation of another embodiment of the gas detector of this invention.

The time constant will usually be lengthened when the surface of the membrane is "poisoned" by direct contact with the oil 20. When a longer time constant can be tolerated, the membrane 30 may be placed directly into the oil 20 as shown in FIG. 4. Thus, any free hydrogen contained in the oil 20 diffuses into the chamber 34 after a sufficient period of time. The tolerable time constant is largely governed by the manner of monitoring the pressure indicator.

Figure 5:
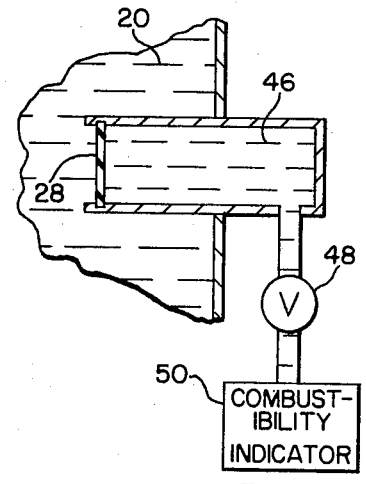
FIG. 5 is a schematic representation of still another embodiment of the gas detector of this invention.

FIG. 5 illustrates an arrangement for the gas detector 12 wherein the combustibility of the gases in the chamber 46 is measured. The gases in the oil 20 diffuse through the membrane 28 and into the chamber 46. When the gases are to be measured, the valve 48 is opened to allow a sample of the gases to be drawn into the combustibility indicator 50. Suitable arrangements are known in the prior are to measure the combustibility of gases and to indicate the measurement obtained.

Figure 6:
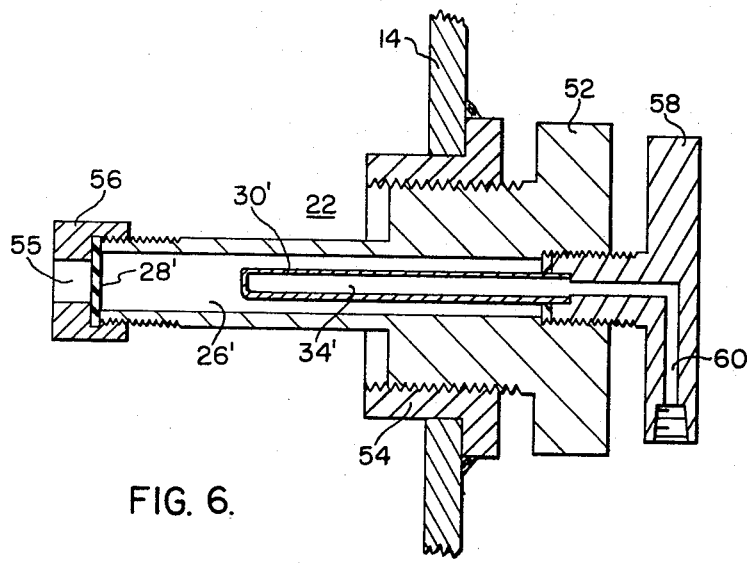
FIG. 6 is a sectional view of a gas separator constructed according to this invention.

A physical arrangement of the gas separator 22 which functions similarly to the arrangement shown in FIG. 2 is illustrated in FIG. 6. A bushing 52 is inserted into a collar 54 which is welded to the transformer tank 14. An opening in the bushing 52 forms the chamber 26'. The opening 55 and the cap 56 allow the oil in the transformer to come into direct contact with the membrane 28'. The gases in the oil diffuse into the chamber 26'. The membrane 30' is a cylindrical tube brazed to the coupling 58. The opening 60 in the coupling 58 allows the chamber 34' to extend to the apparatus required for measuring the pressure within the chamber 34'.

Figure 7:
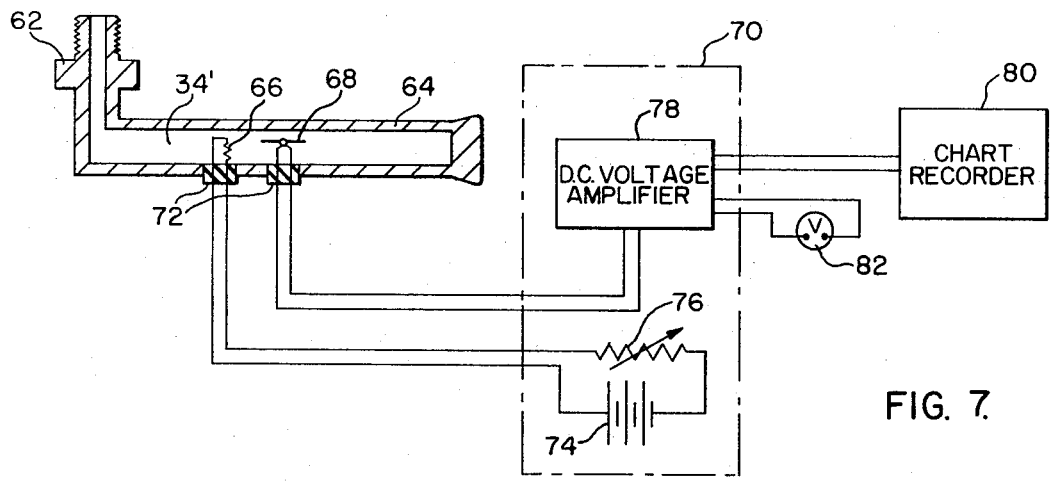
FIG. 7 is a partial view of a gas detector with components constructed for thermal conductivity pressure measurements.

FIG. 7 illustrates apparatus which may be used to measure the pressure of the gas which diffuses through the membrane 30'. The coupling 62 is connected to the gas separator 22 shown in FIG. 6. The chamber 34' is defined by an appropriately shaped tube 64 which has originally been evacuated and sealed. A heat producing element, such as the resistance wire 66, and a heat sensing element, such as the thermocouple 68, are located within the chamber 34' and are electrically connected to the indicator circuits 70 through the bushings 72.

Figure 8:
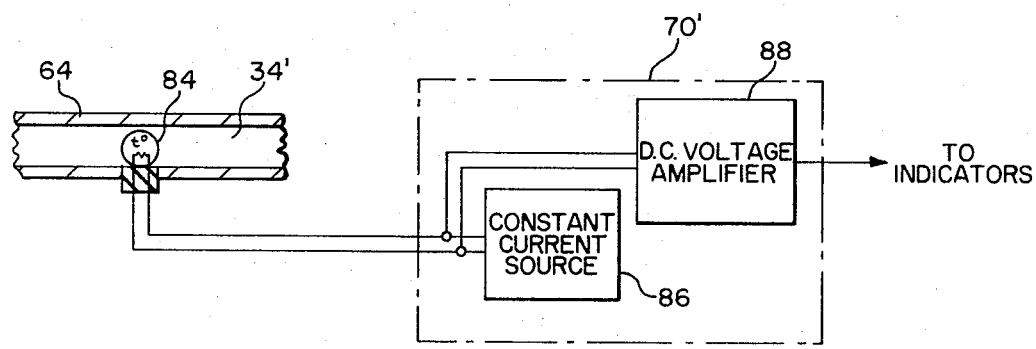
FIG. 8 is a partial view of a gas detector constructed for thermally responsive resistance type pressure measurements.

The battery 74 produces a current in the wire 66 which is adjustable by the variable resistor 76. With the current adjusted to a known value, a definite amount of heat energy is radiated by the wire 66. As the gas pressure in the chamber 34' increases, the heat generated by the wire 66 increases. Thus, the temperature sensed by the thermocouple 68 increases. Therefore, an increase in pressure produces an increase in voltage to the DC voltage amplifier 78. The chart recorder 80 and the voltmeter 82 are responsive to the amplified output voltage and indicate the amount of pressure in the chamber 34'. FIG. 8 is a partial view of the tube 64 shown in FIG. 7, with a different arrangement for detecting the pressure within the chamber 34'. The temperature responsive resistance element 84 is sealed within the chamber 34' and is electrically connected to a constant current source 86. The constant current source 86 causes a predetermined amount of current to flow through the element 84. The greater the pressure in the chamber 34', the greater the conduction of heat away from the element 84. Thus, the temperature and resistance of the element 84 changes, thereby changing the voltage developed across the element 84. This voltage is amplified by the amplifier 88 and is applied to suitable indicators.

Figure 9:
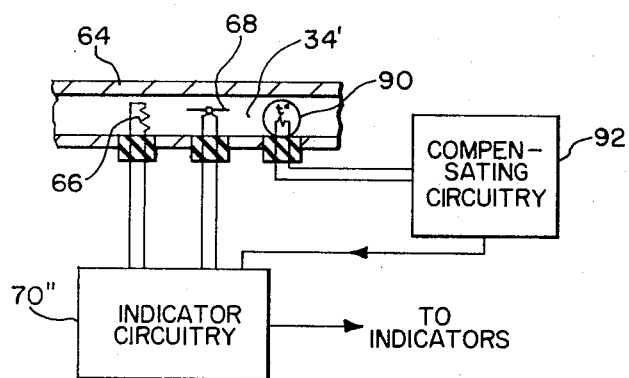
FIG. 9 is a partial view of a gas detector constructed with temperature compensating apparatus.

FIG. 9 illustrates an arrangement of the tube 64 shown in FIG. 7 with the addition of temperature compensating circuitry and components. The pressure indication is governed by the temperature of the thermocouple 68. Since the ambient temperature within the chamber 34' affects the temperature of the thermocouple 68 in addition to the heating element 66, pressure measurements may vary slightly without any compensation for the ambient temperature in the chamber 34'. The temperature responsive resistance element 90 senses the ambient temperature within the chamber 34' with the aid of the compensating circuitry 92 and supplies a corrective signal to the indicator circuitry 70''.

The gas detectors described herein are capable of detecting and indicating small percentages of gases in the oil of oil-filled transformer tanks. Although the invention is described in relation to oil-filled electrical apparatus, it is within the contemplation of this invention that the gas separator may be used with other types of fluid dielectric and coolant.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A gas detector for oil-filled electrical apparatus which indicates the amount of a predetermined gas in the oil, comprising:

a first chamber;

a first diffusion membrane which defines a portion of said first chamber, said gas detector adapted for placement with said first diffusion membrane directly in contact with the oil;

said first diffusion membrane being constructed of a material which permits gas contained in the oil to diffuse through said membrane to equalize the partial pressures of the gases on both sides of said membrane;

a second chamber;

a second diffusion membrane which defines a portion of said second chamber, said second diffusion membrane being located in direct contact with the gaseous atmosphere in the first chamber;

said first and second chambers being sealed for the prevention of any forced fluid flow through the chambers;

said second diffusion membrane being constructed of a material which permits only one predetermined gas which is contained in the gaseous atmosphere to diffuse through said second diffusion membrane to equalize the partial pressures of the predetermined gas on both sides of said second diffusion membrane; and indicating means for indicating the pressure of the predetermined gas in the second chamber.

2. The gas detector of claim 1 wherein the first diffusion membrane material comprises silicone rubber.

3. The gas detector of claim 1 wherein the first diffusion membrane material comprises fluorosilicone rubber.

4. The gas detector of claim 1 wherein the second diffusion membrane material comprises palladium and silver.

5. The gas detector of claim 1 wherein the one predetermined gas is hydrogen.

6. The gas detector of claim 1 wherein the indicating means includes a thermal conductivity gauge electrically connected to a heat generating element and a heat sensing element contained within said second chamber.

7. The gas detector of claim 1 wherein the indicating means includes a temperature compensating means.

8. The gas detector of claim 1 wherein the indicating means includes a temperature responsive resistance element contained within the second chamber, and means for measuring the resistance of the temperature responsive resistance element when a predetermined amount of power is being dissipated thereby.

* * * * *